(12) United States Patent
Plapp et al.

(10) Patent No.: US 9,514,447 B2
(45) Date of Patent: Dec. 6, 2016

(54) MULTI-HORIZON TIME WHEEL

(75) Inventors: Judson Michael Plapp, Rochester Hills, MI (US); Marino Muser, Rochester Hills, MI (US)

(73) Assignee: Dassault Systemes Americas Corp., Waltham, MA (US)

( * ) Notice: Subject to any disclaimer, the term of this patent is extended or adjusted under 35 U.S.C. 154(b) by 732 days.

(21) Appl. No.: 13/337,691

(22) Filed: Dec. 27, 2011

(65) Prior Publication Data

US 2013/0167067 A1 Jun. 27, 2013

(51) Int. Cl.
*G06Q 10/10* (2012.01)
*G06F 17/30* (2006.01)

(52) U.S. Cl.
CPC ....... *G06Q 10/109* (2013.01); *G06F 17/30044* (2013.01); *G06F 17/30274* (2013.01)

(58) Field of Classification Search
CPC ........... G06Q 10/1095; G06Q 10/109; G06Q 10/1093; G06Q 10/063116; G06F 17/30044; G06F 17/30064; G06F 17/30274
See application file for complete search history.

(56) References Cited

U.S. PATENT DOCUMENTS

| | | | | |
|---|---|---|---|---|
| 6,266,814 B1 * | 7/2001 | Lemmons | .......... | H04N 5/44543 348/E5.097 |
| 7,188,073 B1 * | 3/2007 | Tam | .......... | G06Q 10/02 705/5 |
| 7,822,713 B2 * | 10/2010 | Hullot | .......... | G06Q 10/109 707/620 |
| 7,839,723 B2 * | 11/2010 | Adams | .......... | G06Q 10/109 368/10 |
| 8,806,385 B1 * | 8/2014 | Rinckes | .......... | 715/864 |
| 2003/0067492 A1 * | 4/2003 | Cadwallader | .......... | G06Q 10/06 715/779 |
| 2004/0125137 A1 | 7/2004 | Stata et al. | | |
| 2006/0069604 A1 * | 3/2006 | Leukart | .......... | G06Q 10/109 715/792 |
| 2006/0136121 A1 * | 6/2006 | Eisen | .......... | G06Q 10/109 701/532 |
| 2008/0141145 A1 * | 6/2008 | Klausmeier | .......... | G06Q 10/109 715/751 |
| 2008/0163079 A1 * | 7/2008 | Haug | .......... | G06F 3/04847 715/762 |
| 2008/0163117 A1 * | 7/2008 | Machtelinck | .......... | G06F 3/04842 715/822 |
| 2008/0201196 A1 | 8/2008 | Rowland | | |
| 2008/0244425 A1 | 10/2008 | Kikin-Gil et al. | | |
| 2009/0177998 A1 * | 7/2009 | Barrios | .......... | G06F 3/04855 715/799 |
| 2009/0254370 A1 * | 10/2009 | Kondo | .......... | G06F 19/322 705/3 |

(Continued)

OTHER PUBLICATIONS

CSU Starfish; Scheduling Office Hours and Appointments; published on Aug. 21, 2015; https://www.csuohio.edu/sites/default/files/Starfish%20Step%202%20-Set%20up%20your%20Office%20Hours%20and%20Appointments_0.pdf; 3 pages.*

(Continued)

*Primary Examiner* — Linh K Pham
(74) *Attorney, Agent, or Firm* — Hamilton, Brook, Smith & Reynolds, P.C.

(57) ABSTRACT

A computer-implemented method includes storing a plurality of scheduled elements in a memory area, displaying a time horizon via a display device, and displaying a first portion of the plurality of scheduled elements within the time horizon. In response to a user input, the time horizon is adjusted and a second portion of the plurality of scheduled elements is displayed within the adjusted time horizon.

22 Claims, 10 Drawing Sheets

(56) References Cited

U.S. PATENT DOCUMENTS

| | | | |
|---|---|---|---|
| 2009/0299810 A1 | 12/2009 | Jardine et al. | |
| 2010/0070888 A1 | 3/2010 | Watabe et al. | |
| 2010/0099462 A1 | 4/2010 | Baek et al. | |
| 2010/0175001 A1* | 7/2010 | Lazarus | G06Q 10/109 715/753 |
| 2011/0077860 A1* | 3/2011 | Coughlin et al. | 701/204 |
| 2011/0283188 A1 | 11/2011 | Farrenkopf et al. | |
| 2011/0295641 A1* | 12/2011 | Guiheneuf et al. | 705/7.19 |
| 2012/0060166 A1* | 3/2012 | Jardine et al. | 718/104 |
| 2012/0290982 A1* | 11/2012 | Hallock et al. | 715/828 |

OTHER PUBLICATIONS

Shakshuki et al; Software Agent for Meeting Scheduler; © 2006; IEEE; 5 pages.*

Nelson et al., Visual Scheduling to Improve Workflow and Throughput in the University of Virginia Health System Pediatric Specialty Clinic; © 2011; IEEE; 5 pages.*

Bederson, B., et al., "DateLens: A Fisheye Calendar Interface for PDAs," *ACM Transactions on Computer-Human Interaction*, 11(1): 90-119 (Mar. 2004).

European Search Report, EP12199503, date of completion of search: Mar. 22, 2013.

* cited by examiner

MULTI-HORIZON TIME WHEEL

BACKGROUND OF THE INVENTION

The embodiments described herein relate generally to social productivity and, more particularly, to task management for one or more people and/or machines.

A number of known software applications enable a user to display tasks and/or events over time. However, such known software applications do not allow flexibility when viewing variable time durations. Rather, these applications typically only allow a small number of fixed horizons such as a day, a week, or a month. The change of time duration is managed as a transition from a view directly to another view. The different views are generally formatted in a different way such as a weekly view, a daily view, or a monthly view, which implies a discontinuity in the transition. The user is forced to mentally relate the information from one view to another.

Furthermore, such known software applications are either missing or poorly integrate the ability to view tasks of multiple people in a single view that includes easy recognition of which tasks belong to which people in the group.

Accordingly, it is desirable to provide a means of displaying tasks over time such that transition between time durations is smoother and such that tasks assigned to different people can be easily distinguished.

BRIEF DESCRIPTION OF THE INVENTION

In one aspect, a computer-implemented method includes storing a plurality of scheduled elements in a memory area, displaying a time horizon via a display device, and displaying a first portion of the plurality of scheduled elements within the time horizon. The method also includes adjusting the time horizon in response to a user input and displaying a second portion of the plurality of scheduled elements within the adjusted time horizon.

In another aspect, a computer includes a display device, a memory area configured to store a plurality of scheduled elements, and a processor operatively coupled to the display device and the memory area. The processor is configured to cause the display device to display a time horizon, a first portion of the plurality of scheduled elements within the time horizon, and information related to one or more of the first portion of scheduled elements. The processor is also configured to cause the display device to display the adjusted time horizon in response to a user input, a second portion of the plurality of scheduled elements within the adjusted time horizon, and information related to one or more of the second portion of scheduled elements.

In another aspect, a system includes a network, a client system, and a server system communicatively coupled to the client system via the network. The server system is configured to store a plurality of scheduled elements according to at least one property, transmit data representative of a time horizon to the client system, and transmit a first data set representative of a first portion of the plurality of scheduled elements to the client system for display within the time horizon. The server system is also configured to receive a user input from the client system, adjust at least one property of the time horizon in response to the user input, transmit data representative of the adjusted time horizon to the client, and transmit a second data set representative of a second portion of the plurality of scheduled elements to the client system for display within the adjusted time horizon.

BRIEF DESCRIPTION OF THE DRAWINGS

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

Exemplary embodiments of systems, methods, and apparatuses for use in displaying scheduled elements over time are described herein. Moreover, the embodiments described herein can be applied to process planning, work instruction delivery to the shop floor, project planning, project management, product lifecycle management, and/or historical display of past events in a context of people or product (i.e. all of the work done to build an airplane including actions and events over time). Furthermore, the embodiments described herein can be applied to personal or shared agenda applications, as agendas are simple cases of task management. The embodiments described herein facilitate using a variable and user-defined set of time horizons to provide enhanced efficiency, speed, and accuracy to task viewing over time as the user is able to see only the data that is pertinent to him for a given search. In this case the user can also easily adjust the time horizon of the wheel to see more or less information to help him quickly find what he is looking for or to see at a glance the tasks occurring at a particular time. The smooth transition between time horizons allows users to naturally navigate without having to mentally relate different time views such as different views based on a day, a week, or a month.

Moreover, the embodiments herein facilitate displaying only the task data that is required for a performer of a task rather than the complexity of task details for a whole project. Accordingly, the user can easily understand what needs to be accomplished and when. Furthermore, the embodiments here facilitate utilizing both color and fully integrated task display regardless of owner or actor to rapidly view the activities of a group of people, whether it be a family, team, or larger community.

Figure 1:
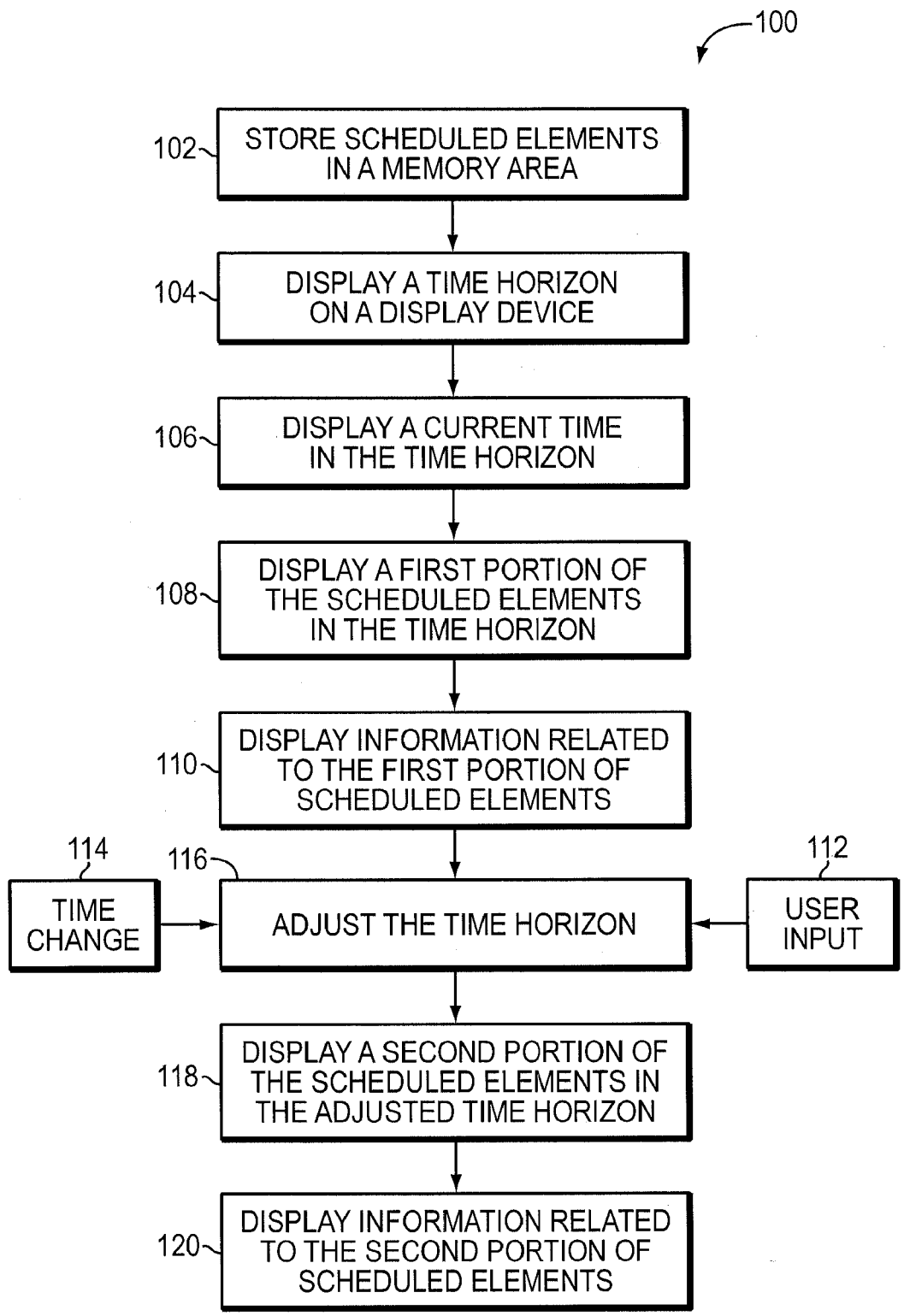
FIG. 1 is a flowchart that illustrates an exemplary computer-implemented method for displaying and managing scheduled elements.

FIG. 1 is a flowchart 100 that illustrates an exemplary computer-implemented method for displaying and managing scheduled elements. In the embodiments described herein, the term "scheduled element" refers generally to a task, a meeting, an event, or any other time-based item that can scheduled. A task can be an action or a group of actions and/or a single event or group of events that encompass a project or multiple projects. Moreover, a task may be connected or assigned to any number of people as part of a community completion of a project, event, or action. Tasks may also be connected or assigned to resources such as machines as part of a project, event, or action. Furthermore, tasks may depend on each other such that completion of a one task cannot begin until completion of a previous task. A meeting can be any scheduled gathering of multiple people at a desired time and place.

It will be understood to one of ordinary skill in the art that tasks, events, and meetings can be scheduled. For example, a start date and/or start time can be scheduled. Similarly, an end date and/or an end time can be scheduled. Tasks, events, and meetings can also have certain assigned properties. For example, a task, event, or meeting can have an assigned duration and/or can be linked to one or more particular projects. Moreover, tasks can have other properties such as a timestamp.

In an exemplary embodiment, a plurality of scheduled elements is stored 102 in a computer memory area, which is described in greater detail below. Moreover, a plurality of properties is stored in the computer memory area and each scheduled element is assigned or associated with one or more of these properties. As described above, such properties may include a start time and/or start date, an end time and/or end date, a duration, a category, a project, an importance, a completion status, or any other suitable property that may be associated with a task, event, or meeting. In addition, such properties may include an assignment to one or more people or groups and/or to one or more machines for completion. Furthermore, such properties may include an assignment or association with one or more projects, other events, other tasks, or other meetings. Such properties may also relate to precedence or dependencies between scheduled elements. For example, one schedule element may depend on completion of another scheduled element. The scheduled elements may also be organized or categorized based on the properties assigned to or associated to them.

In an exemplary embodiment, a time horizon is then displayed 104 on a display device, which is described in greater detail below. The term "time horizon" refers generally to a single, continuous wheel that is scrollable up and down and/or left and right by a user. Moreover, a user can zoom in or out to adjust the view of the time horizon. In an exemplary embodiment, transition of one view of the time horizon to another exhibits no discontinuity of rendering through the use of HTML5 or some other suitable rendering engine or technique. The time horizon includes an indication of the current time and/or the current date that is displayed 106 on the display device. For example, the current date may be shown at the edge of the time horizon, such as along a top edge or a bottom edge of the time horizon. A bar or other suitable indicator can be positioned within the time horizon to indicate the current time. In addition, the time horizon includes a date range and/or a time range. For example, the date range can be shown along an edge of the time horizon, such as along the left edge or the right edge of the time horizon. The time range can similarly be shown along the left edge or the right edge of the time horizon with the time indicator positioned to show the current time within the time range. Furthermore, in some embodiments, a user sets one or more preferences for how the time horizon is initially displayed. For example, the user may open an auto-display dialog and input a desired time duration, which may be expressed in number of hours, days, weeks, months, years, or any desired standard time duration.

The display device is then used to display 108 a first portion of the scheduled elements within the time horizon. For example, the display device may display only those scheduled elements that have a start time and stop time entirely within the time range of the time horizon. Alternatively, the display device may display scheduled elements that start before the time range and either have an end time during the time range or have durations longer than the time range such that the end time is also outside of the time range of the time horizon. Similarly, when the time horizon is displayed in terms of a date range, the display device may display only those scheduled elements that have a start date and stop date entirely within the date range of the time horizon, and/or the display device may display scheduled elements that start before the date range and either have an end time during the date range or have durations longer than the date range.

Moreover, the displayed scheduled elements may be displayed based on a filter selected by a user. For example, the user can select a filter such that only tasks assigned to him are displayed. The user can also filter to display tasks assigned to other users, user groups, or machines. Filters based on location, time, date, duration, or any other suitable property may also be used to control which scheduled elements are displayed within the time horizon.

Figure 2:
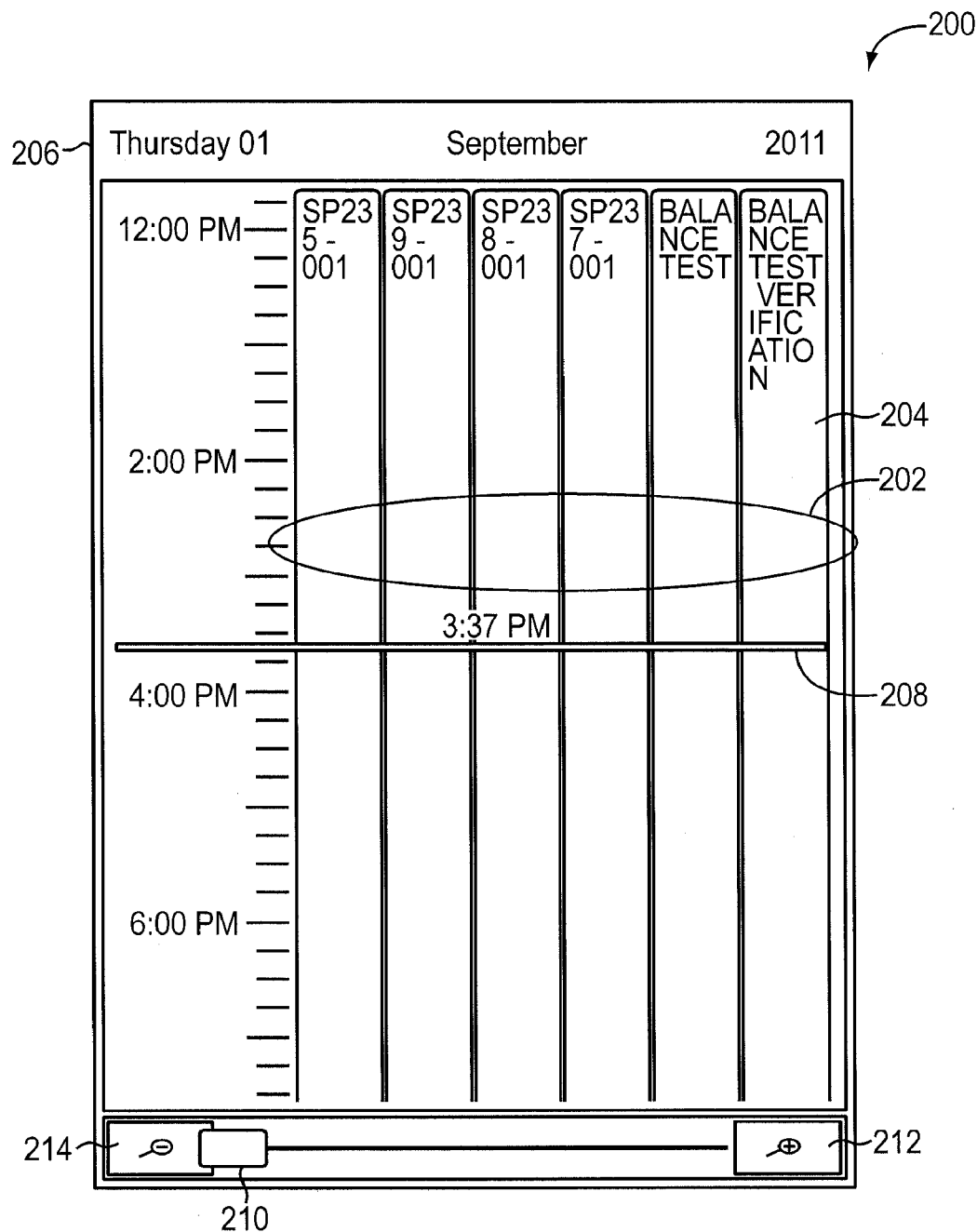
FIG. 2 is a view of an exemplary time horizon displaying scheduled elements.

FIG. 2 is a view of an exemplary time horizon 200 displaying a first portion 202 of scheduled elements 204. As shown in FIG. 2, the duration of the time horizon 200 is eight hours, from approximately noon until approximately 8:00pm. The time horizon 200 includes a current date area 206 that indicates the current day of the week, date, month, and year. As the time horizon 200 is adjusted by, for example, scrolling a wheel up and down, the current date area 206 is changed. The time horizon 200 also includes a current time indicator 208. As shown in FIG. 2, the current time indicator 208 is positioned approximately in the middle of the time horizon 200 by default. However, the display position of the current time indicator 208 may be adjusted according to user preferences. Moreover, the current time indicator 208 is not necessarily a line that crosses the time horizon 200. In some embodiments, for example, the current time indicator 208 is a dashed line, an arrow, or any other suitable shape that indicates the current time within the time horizon 200. Also shown in FIG. 2 are user input tools for adjusting the time horizon 200. Specifically shown in FIG. 2 are a slider 210, a zoom-in button 212, and a zoom-out button 214 that enable a user to change between user-defined durations.

Figure 3:
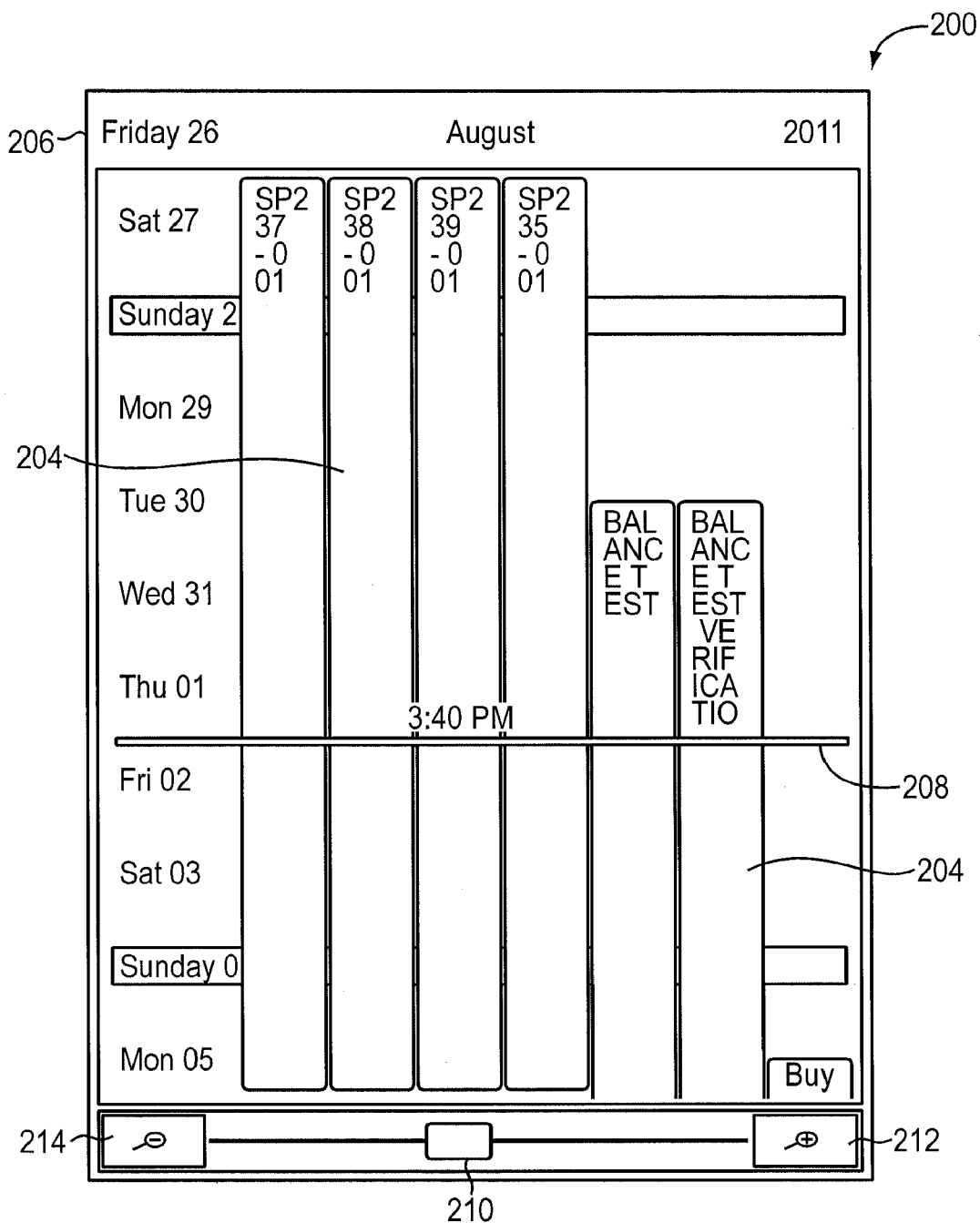
FIG. 3 is another view of a time horizon displaying scheduled elements.

In some embodiments, a user may select distinguishing properties to apply to particular scheduled elements. For example, the user can select a color that is applied to tasks that are assigned to him. The user can also select a color that is applied to tasks assigned to other users, user groups, or machines. Distinguishing properties based on location, time, date, duration, or any other suitable property may also be used to control the display of scheduled elements within the time horizon. Notably, colors are not the only distinguishing properties that may be selected. Other exemplary distinguishing properties include shading, borders, fonts, and/or any other suitable display parameters that can be used to distinguish one scheduled element from another. FIG. 3 is a view of time horizon 200 with a scheduled element 204 having been selected. As shown in FIG. 3, when a scheduled element 204 is selected, via an input device or a touchscreen device, the selected scheduled element 204 is highlighted. The color may be based on the user's unique identifier and can be configured by the user. Similarly, the color may be based on a user group identifier. Moreover, when a scheduled element 204 is selected, the time horizon 200 is automatically adjusted such that entire duration of the selected scheduled element 204 is displayed.

Referring again to FIG. 1, information related to the first portion of scheduled elements is displayed 110 on the display device and within the time horizon. This information can be textual, audio, video, three-dimensional, interactive, or any other suitable type of information. For example, the information may be a unique identifier of each scheduled element, an image of a resource to be used to complete a task within the scheduled element, and the like. Based on a user input 112 and/or as time advances 114, the time horizon is adjusted 116 on the display device. A number of different tools can be used adjust the amount of time displayed by the time horizon. For example, the user can use a slider to increase or decrease the amount of time displayed. Alternatively, the user can use increase (+) or decrease (−) buttons within the user interface to adjust the amount of time displayed. A mouse scroll wheel, up and down arrow keys, page up and page down keys, or any other suitable inputs may also be used. Moreover, a user may manually enter a desired duration in hours, days, or another suitable amount of time. Similarly, the user may manually enter a start date, start time, end date, and/or end time to define the duration. In some embodiments, a user may use touch gestures to adjust the time horizon, such as a pinch gesture that increases the duration of the time horizon or a zoom gesture that decreases the duration of the time horizon. Moreover, in some embodiments, when the scroll wheel or touch gestures are used to increase or decrease the amount of time displayed in the time horizon, the slider is automatically positioned at a location closest to the desired zoom level. Another method of adjusting the time horizon is to select one of the displayed scheduled elements using, for example, a double click. In such an embodiment, the time horizon is automatically resized to fit the entire duration of the selected scheduled element. In some embodiments, the time horizon is automatically adjusted as time passes. For example, as the current time indicator proceeds through the currently-displayed time duration, and at some preselected threshold before the end of the currently-displayed time duration, the time horizon is automatically adjusted to show the same duration with updated start and end times. However, regardless of the manner in which the time horizon input is received, the time horizon is zoomed in to display a smaller time duration or is zoomed out to display a larger time duration.

Also regardless of the manner in which the time horizon input is received, and based on the adjusted time horizon, a second portion of the scheduled elements is displayed 118 in the time horizon. The second portion of scheduled elements may be larger than the first portion, smaller than the first portion, or the same as the first portion. However, the presentation of the second portion will be different because the duration of the time horizon has changed. For example, when a user input causes the time horizon to zoom in to display a smaller time duration, the second portion of scheduled elements will be smaller than the first portion. Conversely, when a user input causes the time horizon to zoom out to display a larger time duration, the second portion of scheduled elements will be larger than the first portion. The time horizon duration may not change at all but, rather, the time horizon may change to a different date or time. In such case, the second portion of the scheduled elements will differ from the first portion according to the start and end times of the first portion and the start and end times of the second portion. Moreover, as described above, when the time horizon is automatically resized to fit the entire duration of the selected scheduled element as the result of a selection, the second portion of scheduled elements will generally be smaller than the first portion. However, if selecting the particular scheduled element causes the time horizon to be zoomed out, the second portion of scheduled elements will be larger than the first portion. Moreover, information related to the second portion of scheduled elements is displayed 120 on the display device and within the time horizon. As described above, this information can be textual, audio, video, three-dimensional, interactive, or any other suitable type of information.

Figure 4:
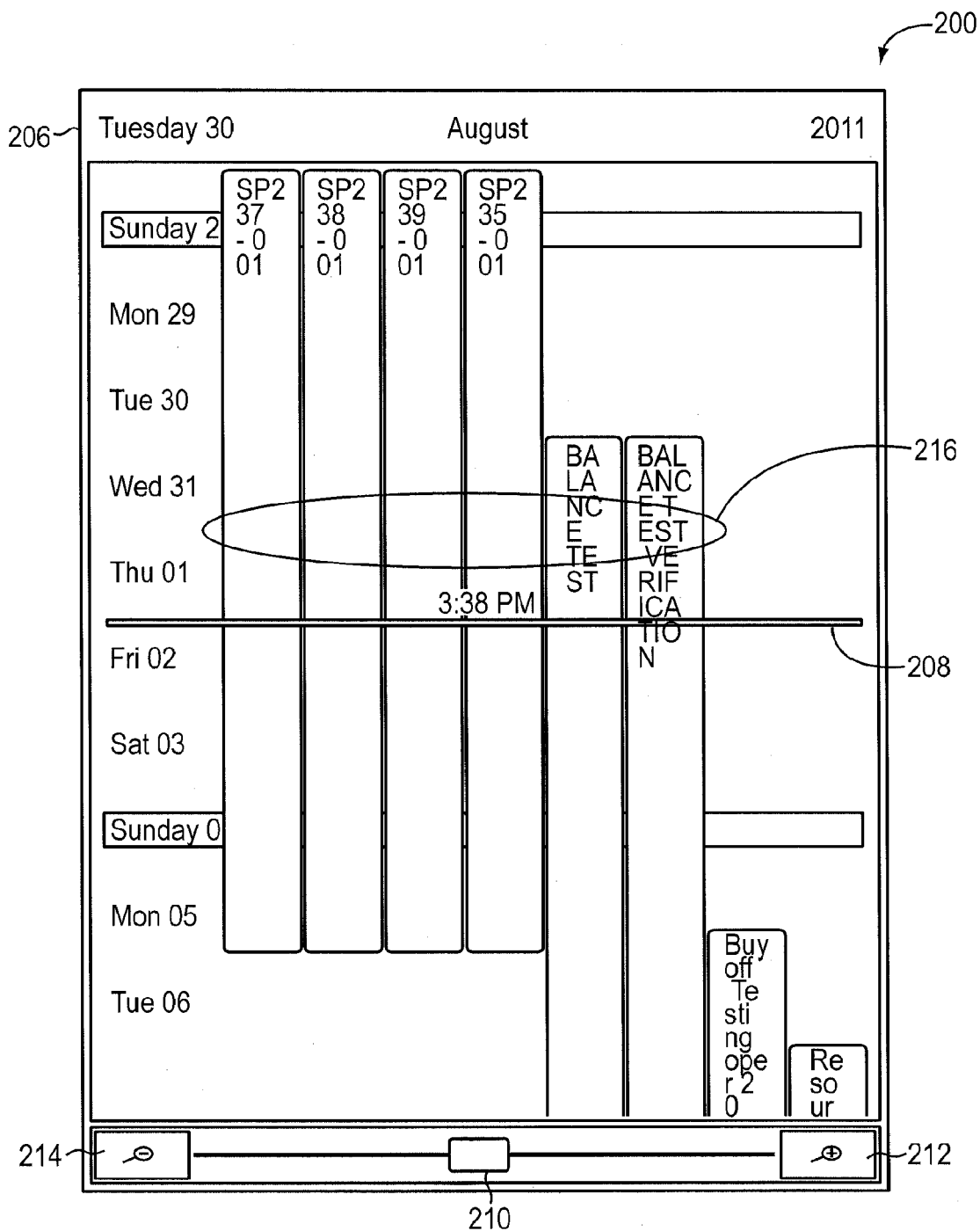
FIG. 4 is a view of a second portion of scheduled elements displayed within the time horizon.

FIG. 4 is a view of the time horizon 200 after a user input has been processed. Specifically, FIG. 4 is a view of a second portion 216 of scheduled elements 204. As shown in FIG. 4, the duration of the time horizon 200 is approximately eleven days. Moreover, the second portion 216 of scheduled elements 204 is different than the first portion 202 (shown in FIG. 2). Adjustments of the time horizon 200 may be made using slider 210, zoom-in button 212, and/or zoom-out button 214. Moreover, the time horizon 200 may be adjusted based on pinch-zoom gestures input via a touchscreen device.

Figure 5:
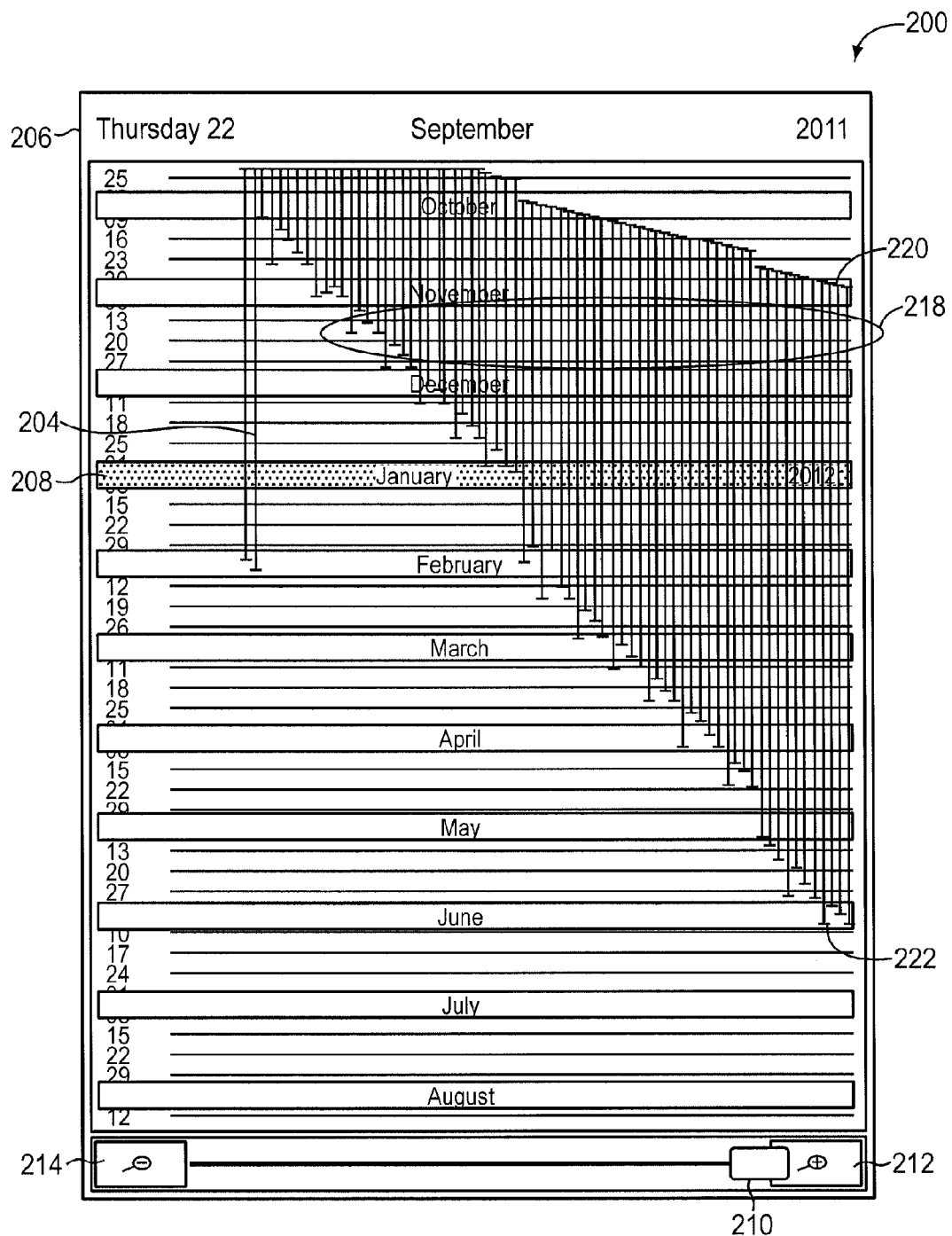
FIG. 5 is a view of a third portion of scheduled elements displayed within the time horizon.

FIG. 5 is a view of time horizon 200 after a user input has been processed. Specifically, FIG. 5 is a view of a third portion 218 of scheduled elements 204. As shown in FIG. 5, the duration of the time horizon 200 is approximately eleven months. Moreover, the third portion 218 of scheduled elements 204 is different than the first portion 202 (shown in FIG. 2) and the second portion 216 (shown in FIG. 4). Each scheduled element 204 is shown in FIG. 5 with a start indicator 220 that represents the start date of that scheduled element 204, and with an end indicator 222 that represents the end date of that scheduled element 204. Notably, when the time horizon 200 is zoomed in such that the duration is shown in hours rather than days or months, the start indicator 220 represents the start time of that scheduled element 204, and the end indicator 222 represents the end time of that scheduled element 204.

Referring again to FIG. 1, and in some embodiments, a user activates a zoom lens to view details about a selected scheduled element. The user may do this by, for example, hovering over the selected scheduled element for a threshold period of time, by double clicking the selected scheduled element, via a touchscreen selection gesture, and/or using any other suitable selection action.

Figure 6:
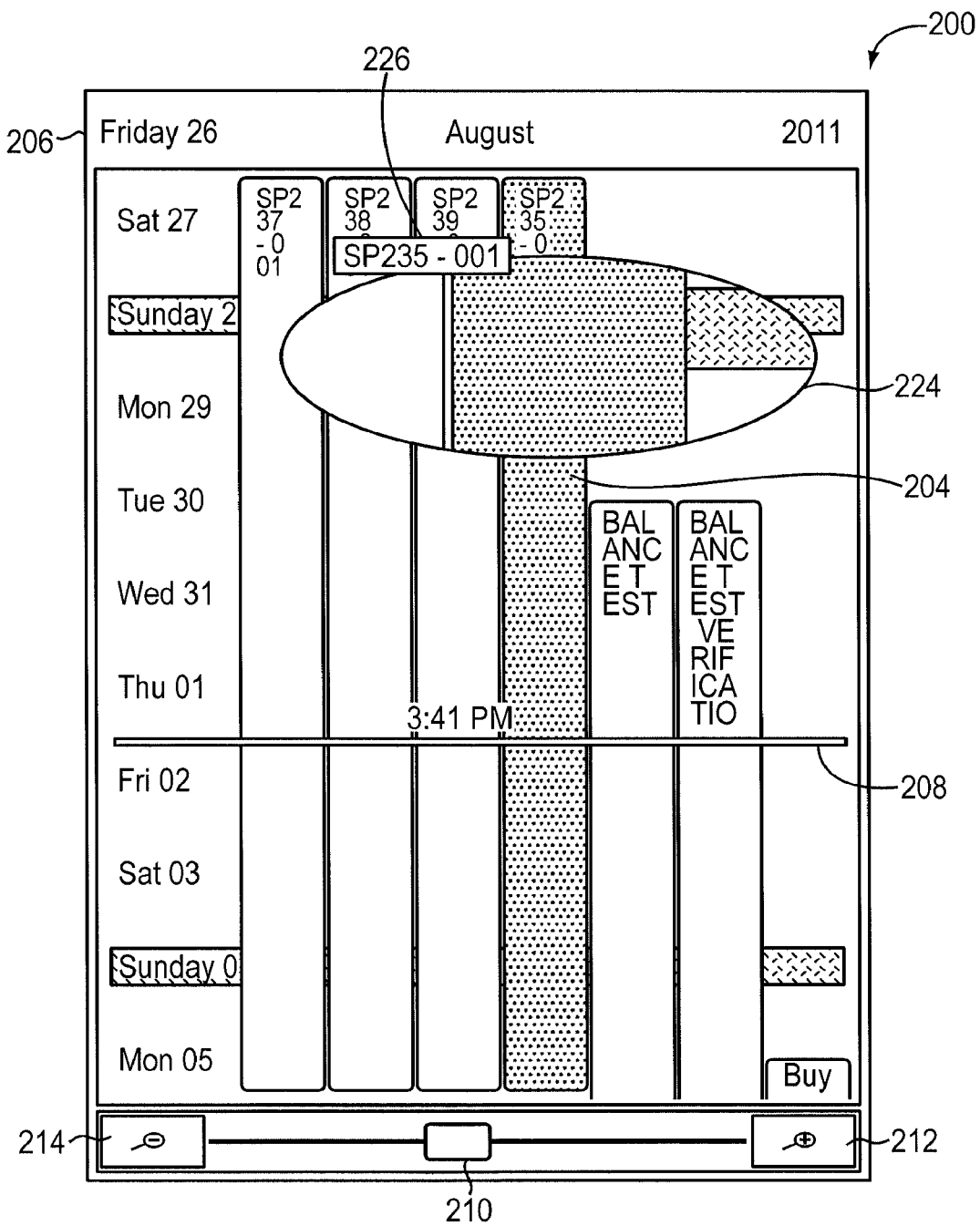
FIG. 6 is a view a time horizon with a zoom lens trained on a selected scheduled element.

FIG. 6 is a view of time horizon 200 with a zoom lens 224 trained on a selected scheduled element 204. When a selected scheduled element 204 is zoomed, the name or identifier 226 of the scheduled element 204 is displayed at the top of a zoom lens 224. The zoom lens 224 enables a user to better distinguish between adjacent scheduled elements 204 when the display is crowded or minimized. To activate the zoom lens 224, the user uses a click-and-hold input when using a mouse or similar input device, or uses a touch-and-hold input when using a touchscreen device.

Figure 7:
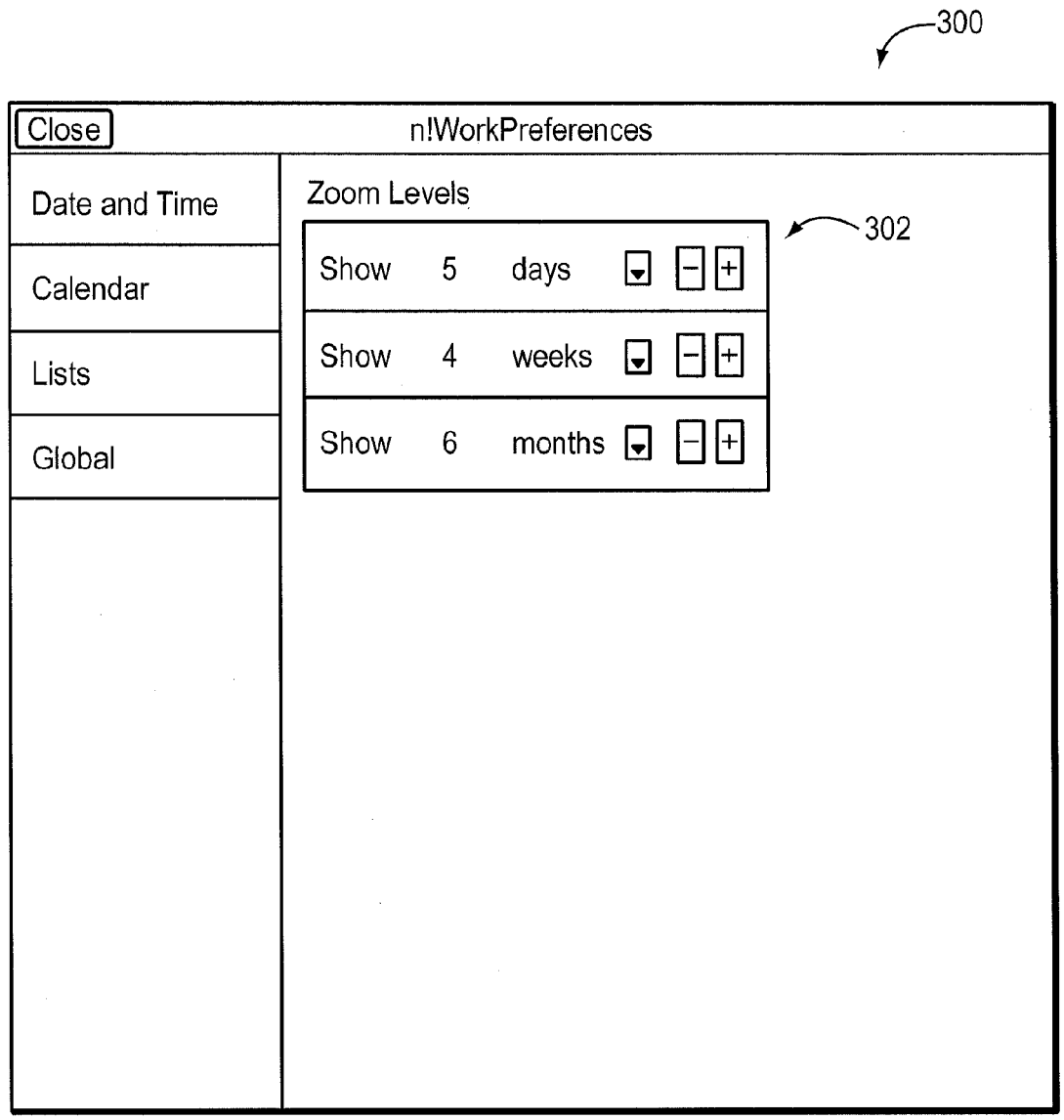
FIG. 7 is a view of an exemplary preferences window for use with the time horizon shown in FIG. 2.

FIG. 7 is a view of an exemplary preferences window 300. As shown in FIG. 7, a user uses the preferences window 300 to modify date and time preferences, calendar preferences, list preferences, and global preferences that are applied to all users, scheduled elements, and the like. FIG. 7 specifically shows an interface 302 that enables a user to define a desired number of fixed time horizon durations. For example, the user can define a desired number of days at a first fixed duration, a desired number of weeks at a second fixed duration, and a desired number of months at a third fixed duration. The user can specify whether the first through third fixed durations are longer or shorter. For example, the user can specify using a drop down menu whether each fixed duration should be in days, weeks, or months.

Figure 8:
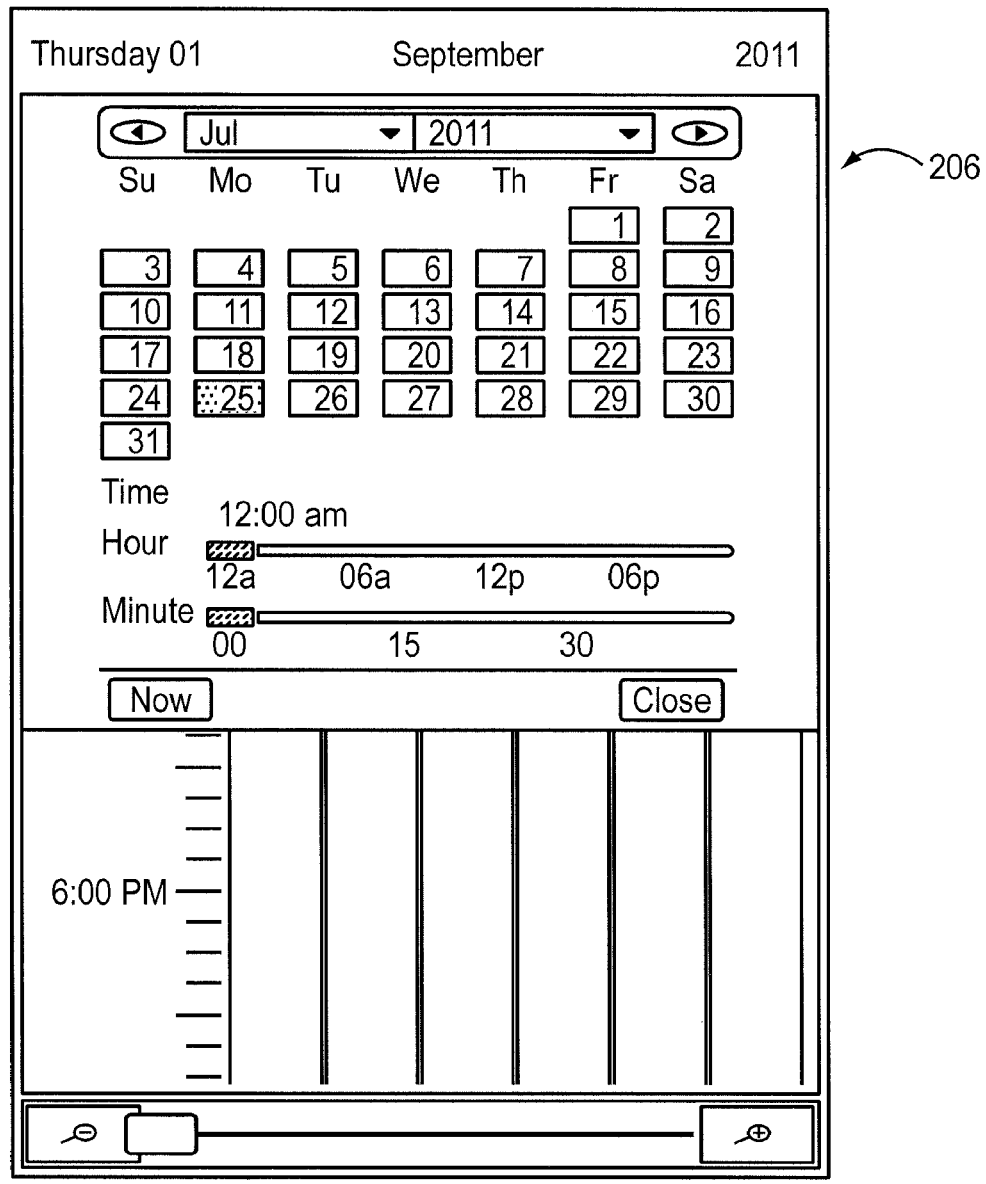
FIG. 8 is a view of a current date area for use with the time horizon shown in FIG. 2 to enable a user to jump to a desired date.

FIG. 8 is a view of the current date area 206 as it is expanded to enable a user to jump to a desired date. Specifically, the user enters a desired date and time and the time horizon 200 is adjusted such that the current time indicator 208 is centered within the time horizon 200. However, the time horizon 200 has the same duration.

Figure 9:
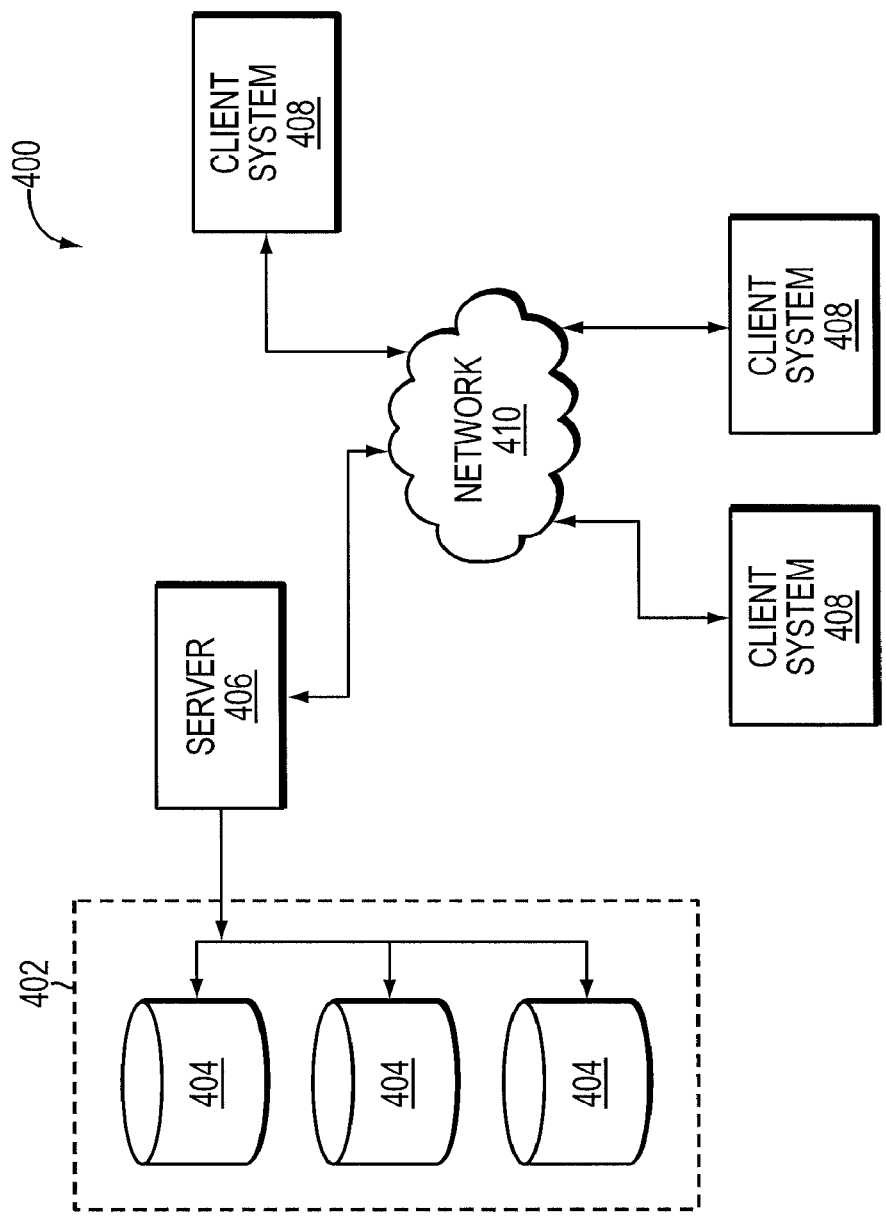
FIG. 9 is a schematic block diagram of an exemplary computer system.

FIG. 9 is a schematic block diagram of an exemplary computer system 400 for use in displaying scheduled elements over time and for use in performing the processes described above and/or additional processes that may be related to those described above. In an exemplary embodiment, a memory area 402 includes one or more storage devices 404 for use in storing data, such as scheduled elements, user information, user group information, activity information, cost information, or any suitable information or data related to scheduled elements. In some embodiments, the memory area 402 is coupled to a server system 406, which is in turn coupled to client systems 408 such as an administrator system and/or a user system, via a network 410. The storage devices 404 may be embodied as one or more databases, may be located at a single or at multiple geographical sites, or may be integrated with the server system 406.

As can be appreciated, the network 410 can be a public network, such as the Internet, or a private network such as an LAN or WAN network, or any combination thereof and can also include PSTN or ISDN sub-networks. The network 410 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 410 is merely exemplary and in no way limits the scope of the present advancements.

As one of ordinary skill in the art would recognize, the client systems 408 can be any suitable computer system such as the one described below with reference to FIG. 10, or any other computing system that is known. Moreover, it should be understood that the server system 406 is configured to perform the processes described above and/or any additional processes that may be related to those described above.

The server system 406 stores the computer-readable instructions to execute the processes described above and provides these instructions via the network 410 to the client systems 408. Moreover, the server system 406 can also provide data from the memory area 402 as needed to the client systems 408. As such, FIG. 9 includes implementations of the computer system 400 via cloud computing, distributed computing, and the like.

During operation, a plurality of scheduled elements 204 (shown in FIGS. 2-5) is stored in the memory area 402. Moreover, a plurality of properties is stored in the memory area 402 and each scheduled element 204 is assigned or associated with one or more of these properties. The server system 406 processes the scheduled elements 204 and the properties to categorize particular scheduled elements 204 and particular properties in the memory area 402, such as by linking a scheduled element to a property in a database. As described above, such properties may include a start time and/or start date, an end time and/or end date, a duration, a category, a project, an importance, a completion status, or any other suitable property that may be associated with a task, event, or meeting. In addition, such properties may include an assignment to one or more people or groups and/or to one or more machines for completion. Furthermore, such properties may include an assignment or association with one or more projects, other events, other tasks, or other meetings. Such properties may also relate to precedence or dependencies between scheduled elements. For example, one schedule element may depend on completion of another scheduled element. The scheduled elements may also be organized or categorized based on the properties assigned to or associated to them.

In an exemplary embodiment, the sever system 406 transmits data representative of a time horizon 200 (shown in FIGS. 2-5) to one or more client systems 408 for display. The server system 406 also transmits a first data set representative of a first portion 202 (shown in FIG. 2) of the scheduled elements 204 to one or more client systems 408 for display within the time horizon 200. The first data set is also representative of information related to the first portion 202 of scheduled elements 204. This information can be textual, audio, video, three-dimensional, interactive, or any other suitable type of information. For example, the information may be a unique identifier of each scheduled element 204, an image of a resource to be used to complete a task within the scheduled element 204, and the like. In some embodiments, one or more of the scheduled elements 204 in the first portion 202 may be part of the first data set based on an association with one or more specified properties. In such an embodiment, the server system 406 searches in the memory area 402 for a unique identifier for each scheduled element 204 in the first portion 202 to determine whether any of the first portion 202 are associated with any stored properties. For example, a client system 408 may display only those scheduled elements 204 that have a start time and stop time entirely within the time range of the time horizon. Alternatively, the client system 408 may display scheduled elements 204 that start before the time range and either have an end time during the time range or have durations longer than the time range such that the end time is also outside of the time range of the time horizon. Similarly, when the time horizon 200 is displayed in terms of a date range, the client system 408 may display only those scheduled elements 204 that have a start date and stop date entirely within the date range of the time horizon 200, and/or the client system 408 may display scheduled elements 204 that start before the date range and either have an end time during the date range or have durations longer than the date range.

Based on a user input and/or as time advances, the client system 408 adjusts display of the time horizon 200. For example, the client system 408 receives the user input and transmits data representative of the user input to the server system 406. The server system 406 determines how the time horizon 200 is to be adjusted based on the user input, and transmits data representative of the adjusted time horizon to the client system 408. A number of different tools can be used adjust the amount of time displayed by the time horizon 200. For example, the user can use a slider 210 (shown in FIGS. 2-5) to increase or decrease the amount of time displayed. Alternatively, the user can use an increase (+) button 212 or a decrease (−) button 214 (both shown in FIGS. 2-5) to adjust the amount of time displayed. A mouse scroll wheel, up and down arrow keys, page up and page down keys, or any other suitable inputs may also be used. Moreover, a user may manually enter a desired duration in hours, days, or another suitable amount of time. Similarly, the user may manually enter a start date, start time, end date, and/or end time to define the duration. In some embodiments, a user may use touch gestures via the client system 408 to adjust the time horizon, such as a pinch gesture that increases the duration of the time horizon or a zoom gesture that decreases the duration of the time horizon. Another method of adjusting the time horizon 200 is to select one of the displayed scheduled elements 204 using, for example, a double click. In such an embodiment, the time horizon 200 is automatically resized to fit the entire duration of the selected scheduled element 204. In some embodiments, the client system 408 automatically adjusts display of the time horizon as time passes. For example, as the current time indicator 208 proceeds through the currently-displayed time duration, and at some preselected threshold before the end of the currently-displayed time duration, the time horizon 200 is automatically adjusted to show the same duration with updated start and end times.

Regardless of the manner in which the time horizon input is received, and based on the adjusted time horizon, the server system 406 transmits to the client system 408 a second data set representative a second portion 216 (shown in FIG. 4) of the scheduled elements 204 for display in the time horizon 200. The second portion 216 of scheduled elements 204 may be larger than the first portion 202, smaller than the first portion 202, or the same as the first portion 202. However, the presentation of the second portion 216 will be different because the duration of the time horizon 200 has changed. For example, when a user input causes the time horizon 200 to zoom in to display a smaller time duration, the second portion 216 of scheduled elements 204 will be smaller than the first portion 202. Conversely, when a user input causes the time horizon 200 to zoom out to display a larger time duration, the second portion 216 of scheduled elements 204 will be larger than the first portion 202. The time horizon duration may not change at all but, rather, the time horizon 200 may change to a different date or time. In such case, the second portion 216 of the scheduled elements 204 will differ from the first portion 202 according to the start and end times of the first portion and the start and end times of the second portion. Moreover, as described above, when the time horizon 200 is automatically resized to fit the entire duration of a scheduled element 204 as the result of a selection, the second portion 216 of scheduled elements 204 will generally be smaller than the first portion 202. However, if selecting the particular scheduled element 204 causes the time horizon 200 to be zoomed out, the second portion 216 of scheduled elements 24 will be larger than the first portion 202. Similar to the first data set, the second data set is also representative of information related to the second portion 216 of scheduled elements 204. As described above, this information can be textual, audio, video, three-dimensional, interactive, or any other suitable type of information. For example, the information may be a unique identifier of each scheduled element 204, an image of a resource to be used to complete a task within the scheduled element 204, and the like.

In some embodiments, a user of the client system 408 activates a zoom lens 226 (shown in FIG. 6) to view details about a selected scheduled element 204. The user may do this by, for example, hovering over the selected scheduled element 204 for a threshold period of time, by double clicking the selected scheduled element 204, via a touch-screen selection gesture at the client system 408, and/or using any other suitable selection action.

Figure 10:
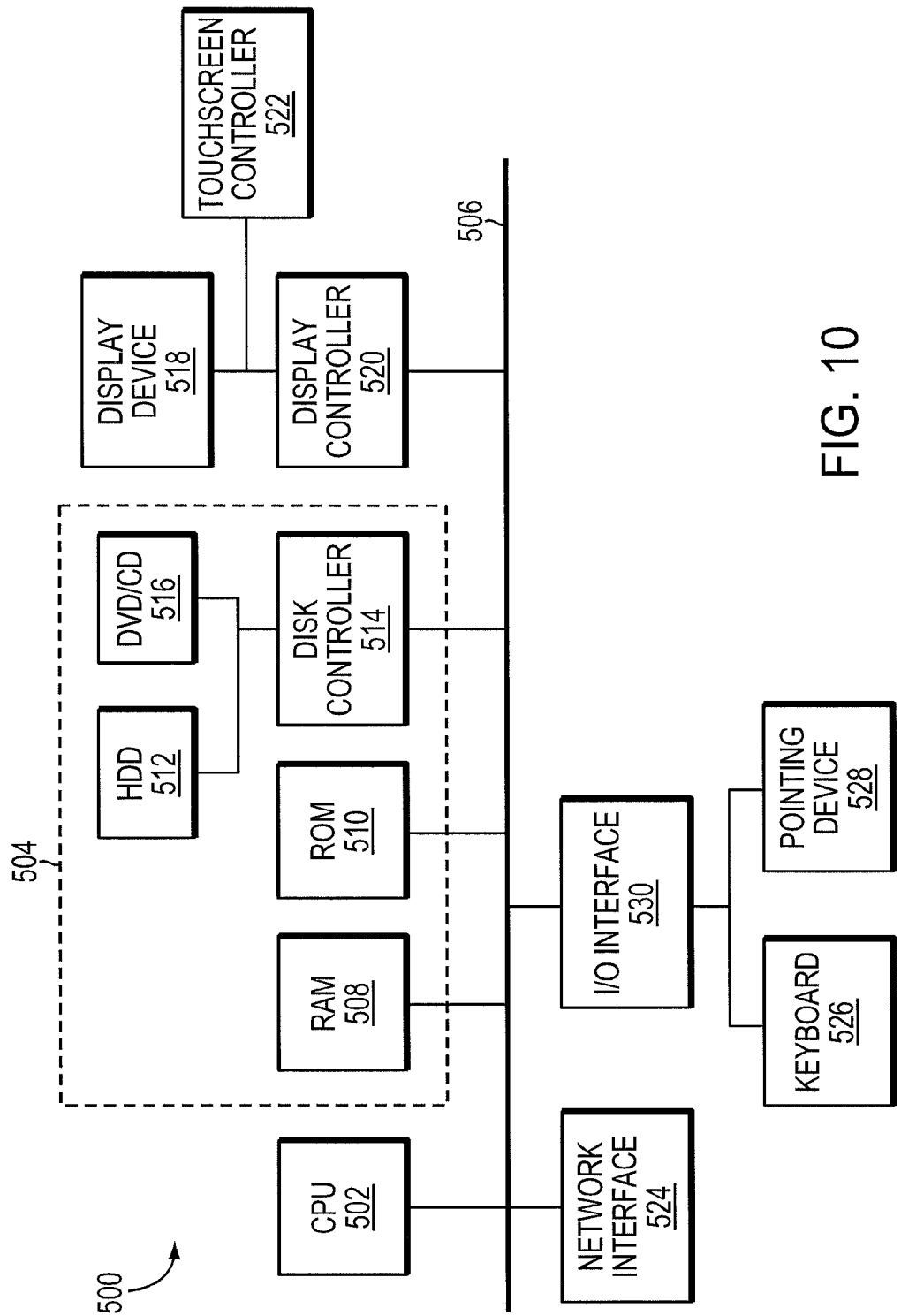
FIG. 10 is a schematic block diagram of an exemplary computer architecture for use with the computer system shown in FIG. 9.

FIG. 10 is a schematic block diagram of an exemplary computer architecture 500 for use with the server system 406 and/or the client systems 408 (each shown in FIG. 9).

In an exemplary embodiment, the computer architecture 500 includes one or more processors 502 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 504 that is operably and/or communicatively coupled to the processor 502 by a system bus 506. A "memory area," as used herein, refers generally to any means of storing program code and instructions executable by one or more processors to aid in displaying scheduled elements over time and for use in performing the processes described above and/or additional processes that may be related to those described above. The memory area 504 may include one, or more than one, forms of memory. For example, the memory area 504 may include random-access memory (RAM) 508, which can include non-volatile RAM, magnetic RAM, ferroelectric RAM, and/or other forms of RAM. The memory area 504 may also include read-only memory (ROM) 510 and/or flash memory and/or electrically-programmable read-only memory (EEPROM). Any other suitable magnetic, optical, and/or semiconductor memory, such as a hard-disk drive (HDD) 512, by itself or in combination with other forms of memory, may be included in the memory area 504. The HDD 512 may also be coupled to a disk controller 514 for use in transmitting and receiving messages to and from the processor 502. Moreover, the memory area 504 may also be, or may include, a detachable or removable memory 516, such as a suitable cartridge disk, CD-ROM, DVD, or USB memory. The above examples are exemplary only and, thus, are not intended to limit in any way the definition and/or meaning of the term "memory area."

The computer architecture 500 also includes a display device 518 that is coupled, such as operatively coupled, to a display controller 520. The display controller 520 receives data via the system bus 506 for display by the display device 518. The display device 518 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 518 may include a touchscreen with an associated touch-screen controller 522. The above examples are exemplary only and, thus, are not intended to limit in any way the definition and/or meaning of the term "display device."

In addition, the computer architecture 500 includes a network interface 524 for use in communicating with a network (not shown in FIG. 10). Moreover, the computer architecture 500 includes one or more input devices, such as a keyboard 526 and/or a pointing device 528, such as a roller ball, mouse, touchpad, and the like. The input devices are coupled to and controlled by an input/output (I/O) interface 530, which is further coupled to the system bus 506.

A description of the general features and functionality of the display device 518, keyboard 526, pointing device 528, as well as the display controller 520, disk controller 514, network interface 524, and I/O interface 530 is omitted herein for brevity as these features are known.

During operation, a plurality of scheduled elements 204 (shown in FIGS. 2-5) is stored in the memory area 504. Moreover, a plurality of properties is stored in the memory area 504 and the processor 502 categorizes each scheduled element 204 in association with one or more of these properties. In an exemplary embodiment, the processor 502 causes the display device 518 to display a time horizon 200 (shown in FIGS. 2-5). The time horizon 200 includes an indication 208 (shown in FIGS. 2-5) of the current time and/or the current date. A bar or other suitable indicator can be positioned within the time horizon 200 to indicate the current time. In addition, the time horizon 200 includes a date range and/or a time range.

The processor 502 also causes the display device 518 to display a first portion 202 (shown in FIGS. 2-5) of the scheduled elements 204 within the time horizon 200. The first portion 202 of the scheduled elements 204 may be displayed based on the properties stored in the memory area 504. Moreover, one or more of the first portion 202 may be identified on the display device 518 according to one or more of the stored properties, such as a user identifier, project identifier, and the like. The processor 502 determines whether to display and/or identify the scheduled elements 204 by matching a unique identifier of each of the first portion 202 in the memory area 504 and by detecting whether any properties are associated with the unique identifier. For example, the display device 518 may display only those scheduled elements 204 that have a start time and stop time entirely within the time range of the time horizon 200. Alternatively, the display device 518 may display scheduled elements 204 that start before the time range and either have an end time during the time range or have durations longer than the time range such that the end time is also outside of the time range of the time horizon 200. Similarly, when the time horizon 200 is displayed in terms of a date range, the display device 518 may display only those scheduled elements 204 that have a start date and stop date entirely within the date range of the time horizon 200, and/or the display device 518 may display scheduled elements 204 that start before the date range and either have an end time during the date range or have durations longer than the date range. In an exemplary embodiment, the processor 502 also causes the display device 518 to display a current date area 206 and/or a current time indicator 208 (both shown in FIGS. 2-5). Moreover, the processor 502 causes the display device 518 to display information related to the first portion 202 of scheduled elements 204. This information can be textual, audio, video, three-dimensional, interactive, or any other suitable type of information. For example, the information may be a unique identifier of each scheduled element 204, an image of a resource to be used to complete a task within the scheduled element 204, and the like.

Based on a user input and/or as time advances, the time horizon 200 is adjusted on the display device 518 by the processor 502. A number of different tools can be used adjust the amount of time displayed by the time horizon 200. For example, the user can use a slider 210 (shown in FIGS. 2-5) to increase or decrease the amount of time displayed. Alternatively, the user can use an increase (+) button 212 or a decrease (−) button 214 (both shown in FIGS. 2-5) within the user interface to adjust the amount of time displayed. A mouse scroll wheel, up and down arrow keys, page up and page down keys, or any other suitable inputs may also be used. Moreover, a user may manually enter a desired duration in hours, days, or another suitable amount of time. Similarly, the user may manually enter a start date, start time, end date, and/or end time to define the duration. In some embodiments, a user may use touch gestures to adjust the time horizon 200, such as a pinch gesture that increases the duration of the time horizon 200 or a zoom gesture that decreases the duration of the time horizon 200. Moreover, in some embodiments, when the scroll wheel or touch gestures are used to increase or decrease the amount of time displayed in the time horizon 200, the slider 210 is automatically positioned at a location closest to the desired zoom level. Another method of adjusting the time horizon 200 is to select one of the displayed scheduled elements 204 using, for example, a double click. In such an embodiment, the time horizon 200 is automatically resized to fit the entire duration of the selected scheduled element 204. In some embodiments, the time horizon 200 is automatically adjusted as time passes. For example, as the current time indicator proceeds through the currently-displayed time duration, and at some preselected threshold before the end of the currently-displayed time duration, the time horizon 200 is automatically adjusted to show the same duration with updated start and end times.

Also regardless of the manner in which the time horizon 200 input is received, and based on the adjusted time horizon, the processor 502 causes the display device 518 to display a second portion 216 (shown in FIG. 4) of the scheduled elements 204 within the time horizon 200. As described above, the second portion 216 of scheduled elements 204 may be larger than the first portion 202, smaller than the first portion 202, or the same as the first portion 202. In some embodiments, a user activates a zoom lens 226 (shown in FIG. 6) to view details about a selected scheduled element 204. The user may do this by, for example, hovering over the selected scheduled element 204 for a threshold period of time, by double clicking the selected scheduled element 204, via a touchscreen selection gesture, and/or using any other suitable selection action. Moreover , the processor 502 causes the display device 518 to display information related to the second portion 216 of scheduled elements 204. As described above, this information can be textual, audio, video, three-dimensional, interactive, or any other suitable type of information. For example, the information may be a unique identifier of each scheduled element 204, an image of a resource to be used to complete a task within the scheduled element 204, and the like.

Exemplary embodiments of systems, methods, and apparatuses for use in displaying scheduled elements over time are described above in detail. The systems, methods, and apparatuses are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer system or server system, such as those described herein, includes at least one processor or processing unit and a system memory. The computer system or server system typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
   storing a plurality of scheduled elements in a memory area;
   displaying a continuously user-scrollable time horizon via a display device;
     wherein the displayed time horizon provides views of time, each view spanning across a user definable time range and/or user definable date range, the views of time of the displayed time horizon being of variable and user-defined time duration and being separate and distinct from the scheduled elements, such that for each stored scheduled element, start time of the scheduled element, end time of the scheduled element and duration of the scheduled element are based on predefined certain hours in a day, predefined certain days in a week, and predefined weeks in a month, but each view of time of the displayed time horizon is based on the user definable time range, user definable date range and user-defined time duration that are different from the predefined certain hours in a day, predefined certain days in a week, and predefined weeks in a month;
   displaying a first number of the plurality of scheduled elements within the views of time of the displayed time horizon;
   responsive to a user input, adjusting the views of time of the displayed time horizon from a first time duration to a second time duration, the first time duration having a first set of user defined time range and user defined date range, and the second time duration having a second set of user defined time range and user defined date range;
     wherein the user defined time range and user defined date range of the first set is different from the user defined time range and user defined date range of the second set, the first time duration and the first set of user defined time range and user defined date range being different from the predefined certain hours in a day, predefined certain days in a week and predefined weeks in a month, and the second time duration and the second set of user defined time range and user defined date range being different from the predefined certain hours in a day, predefined certain days in a week and predefined weeks in a month;
   displaying the adjusting of the views of time of the displayed time horizon from the first time duration to the second time duration through a smooth transition between time durations of the time horizon, the smooth transition between time durations including displaying views of time of the time horizon being of intermediate time durations with some of the stored scheduled elements displayed within the intermediate time durations; and
   displaying a second number of the plurality of scheduled elements within the adjusted views of time of the time horizon.

2. The computer-implemented method according to claim 1, further comprising storing in the memory area at least one property for each of the plurality of scheduled elements.

3. The computer-implemented method according to claim 2, further comprising categorizing the plurality of scheduled elements based on the at least one property.

4. The computer-implemented method according to claim 2, wherein displaying a first number of the plurality of scheduled elements comprises displaying at least one scheduled element based on the at least one property.

5. The computer-implemented method according to claim 2, wherein displaying a first number of the plurality of scheduled elements comprises identifying at least one of the scheduled elements of the first number of the plurality of scheduled elements according to the at least one property.

6. The computer-implemented method according to claim 1, wherein displaying a time horizon comprises displaying at least one of a current date, a date range, and a time range.

7. The computer-implemented method according to claim 1, wherein displaying a time horizon comprises displaying an indicator representative of a current time within the time horizon.

8. The computer-implemented method according to claim 1, further comprising receiving the user input via one of an input device and a touchscreen.

9. The computer-implemented method according to claim 1, wherein:
displaying a first number of the plurality of scheduled elements comprises displaying information related to one or more of the scheduled elements of the first number of the plurality of scheduled elements; and
displaying a second number of the plurality of scheduled elements comprises displaying information related to one or more of the scheduled elements of the second number of the plurality of scheduled elements.

10. A computer comprising:
a display device;
a memory area configured to store a plurality of scheduled elements; and
a processor operatively coupled to said display device and said memory area, said processor configured to:
cause said display device to display a continuously user-scrollable time horizon;
wherein the displayed time horizon provides views of time, each view spanning across a user definable time range and/or user definable date range, the views of time of the displayed time horizon being of variable and user-defined time duration and being separate and distinct from the scheduled elements, such that for each stored scheduled element, start time of the scheduled element, end time of the scheduled element and duration of the scheduled element are based on predefined certain hours in a day, predefined certain days in a week, and predefined weeks in a month, but each view of time of the displayed time horizon is based on the user definable time range, user definable date range and user-defined time duration that are different from the predefined certain hours in a day, predefined certain days in a week, and predefined weeks in a month;
cause said display device to display a first subset of the plurality of scheduled elements within one view of time of the displayed time horizon;
cause said display device to display information related to one or more of the scheduled elements in the first subset of the plurality of scheduled elements;
responsive to a user input, cause the one view of time of the time horizon to be adjusted from a first time duration to a second time duration, the first time duration having a first set of user defined time range and user defined date range, and the second time duration having a second set of user defined time range and user defined date range;
wherein the user defined time range and user defined date range of the first set is different from the user defined time range and user defined date range of the second set the first time duration and the first set of user defined time range and user defined date range being different from the predefined certain hours in a day, predefined certain days in a week and predefined weeks in a month, and the second time duration and the second set of user defined time range and user defined date range being different from the predefined certain hours in a day, predefined certain days in a week and predefined weeks in a month;
cause said display device to display the adjusting of the one view of time of the time horizon from the first time duration to the second time duration through a smooth transition between time durations of the time horizon, the smooth transition between time durations including displaying views of time of the time horizon being of intermediate time durations with some of the stored scheduled elements displayed within the intermediate time durations; and
cause said display device to display a second subset of the plurality of scheduled elements within the adjusted view of time of the time horizon; and
cause said display device to display information related to one or more of the scheduled elements in the second subset of the plurality of scheduled elements.

11. The computer according to claim 10, wherein said memory area is further configured to store at least one property for each of the plurality of scheduled elements.

12. The computer according to claim 11, wherein said processor is further configured to categorize the plurality of scheduled elements based on the at least one property.

13. The computer according to claim 11, wherein said processor is further configured to cause said display device to display at least one element based on the at least one property.

14. The computer according to claim 11, wherein said processor is further configured to identify at least one of the scheduled elements of the first subset of the plurality of scheduled elements according to the at least one property.

15. The computer according to claim 10, wherein said processor is further configured to cause said display device to display at least one of a current date, a date range, and a time range.

16. The computer according to claim 10, wherein said processor is further configured to cause said display device to display an indicator representative of a current time within the time horizon.

17. A computer system comprising:
a communication network;
a client system; and
a server system communicatively coupled to said client system via said network, said server system configured to:
store a plurality of scheduled elements;
transmit data representative of a continuously user-scrollable time horizon to said client system;
wherein the time horizon provides views of time, each view having a user definable time range and/or user definable date range, the views of time of the time horizon being of variable and user-defined time duration and being separate and distinct from the scheduled elements, such that for each stored scheduled element, start time of the scheduled element, end time of the scheduled element and duration of the scheduled element are based on predefined certain hours in a day, predefined certain days in a week, and predefined weeks in a month, but each view of time of the displayed time horizon is based on the user definable time range, user definable date range and user-defined time duration that are different from the predefined certain hours in a day, predefined certain days in a week, and predefined weeks in a month;

transmit a first data set representative of a first number of the plurality of scheduled elements to said client system for display within the views of time of the time horizon;
receive a user input from said client system;
adjust at least one property of the time horizon in response to the user input;
such that the views of time of the time horizon are adjusted from a first time duration to a second time duration, the first time duration having a first set of user defined time range and user defined date range, and the second time duration having a second set of user defined time range and user defined date range;
wherein the user defined time range and user defined date range of the first set is different from the user defined time range and user defined date range of the second set, the first time duration and the first set of user defined time range and user defined date range being different from the predefined certain hours in a day, predefined certain days in a week and predefined weeks in a month, and the second time duration and the second set of user defined time range and user defined date range being different from the predefined certain hours in a day, predefined certain days in a week and predefined weeks in a month;
transmit data representative of the adjusted views of time of the time horizon to said client;
wherein the views of time of the time horizon are adjusted from the first time duration to the second time duration through a smooth transition between time durations of the time horizon, the smooth transition between time durations including displaying views of time of the time horizon being of intermediate time durations and some of the stored scheduled elements being displayed within the intermediate time durations; and
transmit a second data set representative of a second number of the plurality of scheduled elements to said client system for display within the adjusted views of time of the time horizon.

18. The system according to claim 17, wherein said server system is further configured to store at least one property for each of the plurality of scheduled elements.

19. The system according to claim 18, wherein said server system is further configured to categorize the plurality of scheduled elements based on the at least one property.

20. The system according to claim 18, wherein at least one element of the plurality of scheduled elements is displayed based on the at least one property.

21. The system according to claim 17, wherein the time horizon includes an indication of a current time.

22. The system according to claim 17, wherein the first data set is further representative of information related to one or more of the scheduled elements of the first number of the plurality of scheduled elements for display by said client system within the views of time of the time horizon and the second data set is further representative of information related to one or more of the scheduled elements of the second number of the plurality of scheduled elements for display by said client system within the views of time of the time horizon.

* * * * *